United States Patent [19]
Hofbauer

[11] 3,985,476
[45] Oct. 12, 1976

[54] ROTARY INTERNAL COMBUSTION ENGINE WITH VALVED INLET THROUGH PISTON

[75] Inventor: Peter Hofbauer, Wolfsburg, Germany

[73] Assignee: Volkswagenwerk Aktiengesellschaft, Wolfsburg, Germany

[22] Filed: Jan. 31, 1975

[21] Appl. No.: 546,015

[30] Foreign Application Priority Data
Feb. 6, 1974    Germany............................ 2405557

[52] U.S. Cl. .............. 418/61 B; 418/185; 418/186
[51] Int. Cl.² .................... F01C 1/02; F01C 21/12; F02B 55/14
[58] Field of Search ........ 418/61 B, 183, 185–188; 123/8.45

[56] References Cited
UNITED STATES PATENTS

| | | |
|---|---|---|
| 3,181,512 | 5/1965 | Hapeman............................ 418/185 |
| 3,452,723 | 7/1969 | Keylwert............................. 418/186 |
| 3,514,235 | 5/1970 | Yamauchi........................ 418/61 A |
| 3,872,838 | 3/1975 | Vogelsang et al................. 418/61 B |
| 3,883,273 | 5/1973 | King................................... 418/185 |

FOREIGN PATENTS OR APPLICATIONS
1,551,123   10/1970   Germany ........................... 418/183

Primary Examiner—John J. Vrablik
Attorney, Agent, or Firm—Brumbaugh, Graves, Donohue & Raymond

[57] ABSTRACT

A rotary piston, internal combustion engine of the trochoid type is disclosed. The piston is arranged to rotate planetary fashion within a surrounding housing and has inlet and outlet channels therein for the inflow and outflow, respectively, of the working medium. According to the invention, a spring-loaded check flap is provided in each of the inlet channels to improve the charge alternation of the engine.

6 Claims, 6 Drawing Figures

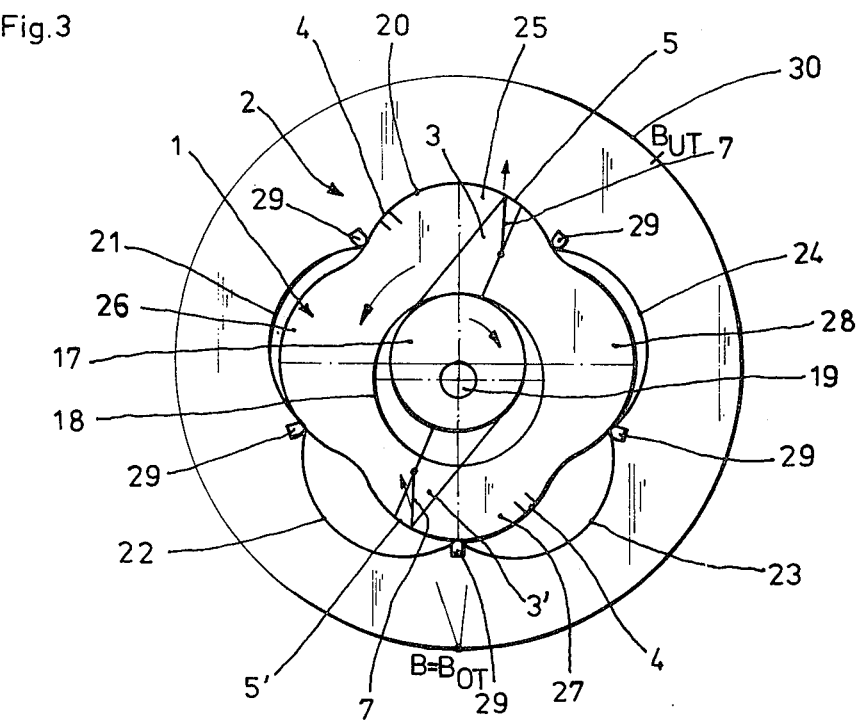
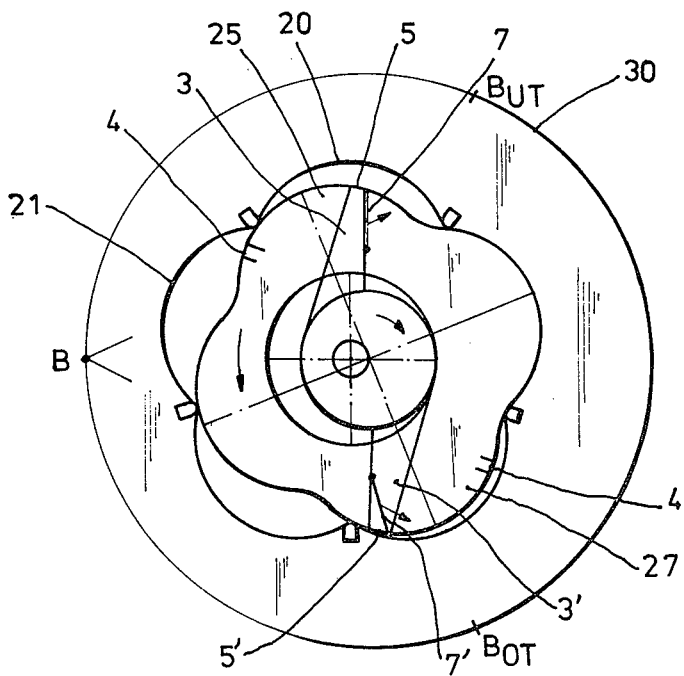

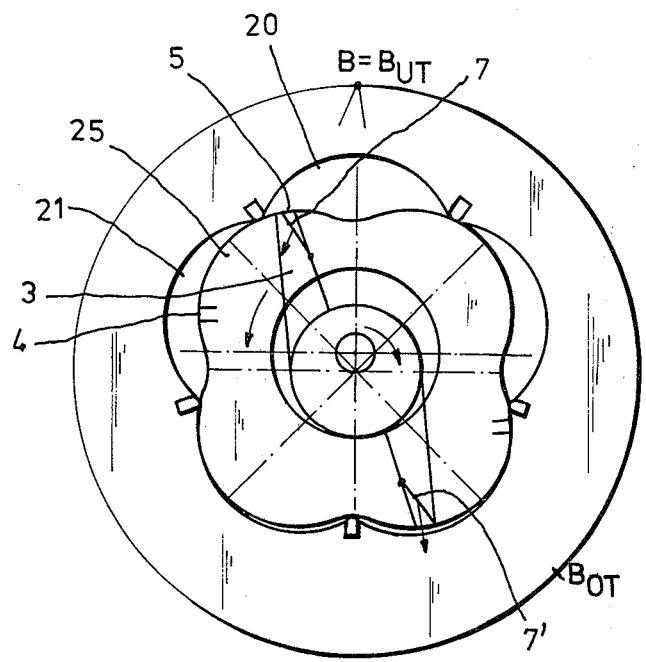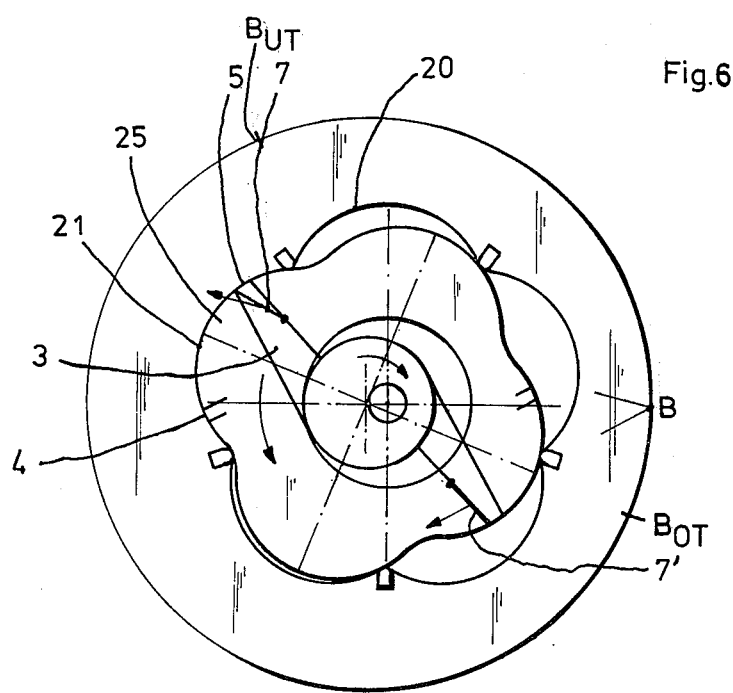

3,985,476

ROTARY INTERNAL COMBUSTION ENGINE WITH VALVED INLET THROUGH PISTON

BACKGROUND OF THE INVENTION

The present invention relates generally to a rotary piston, internal combustion engine and, in particular, to a circular piston engine of the trochoid type, having a piston arranged to rotate planetary-fashion within a surrounding housing. The piston has inlet and outlet channels or passages arranged therein for the inflow and outflow, respectively, of the working medium. The inlet and outlet channels lead to inlet and outlet openings arranged on the periphery of every other arcuate lobe of the piston, such inlet and outlet openings being controlled by the disposition of the particular lobe of the piston in relation to the working chambers formed by arcuate recesses in the housing.

In known rotary piston, internal combustion engines of the above-described type, no special valve members or devices are employed to control the charge alternation (inflow and outflow of gases) within the engine. Rather, the exchange of gases has been allowed to take place as the inlet and outlet openings, arranged on the periphery of the piston, move into and out of the several arcuate working chambers arranged in the housing. In order to carry out a four-cycle process in such an internal combustion engine, the inlet and outlet openings are arranged on every other lobe of the piston, the inlet opening being arranged in the posterior region of the lobe, in relation to direction of rotation of the piston, and the outlet opening in the anterior region thereof.

Now it has been found that in the regions of the top dead centers of each piston lobe having the inlet and outlet channels an overlap of inlet and outlet channels occurs in each of the several working chambers. This overlap begins at the moment when an inlet opening enters a working chamber and ends when the outlet opening situated on the same lobe of the piston exits from that working chamber. This inlet and outlet channel overlap permits gases to flow through both the inlet and outlet opening at the same time, resulting in gas exchange losses. These gas exchange losses occurring during this overlap impair the efficiency of the engine.

SUMMARY OF THE INVENTION

It is an object of the present invention to improve the gas exchange control in an internal combustion engine of the above-mentioned type by the simplest possible means.

This object, as well as other objects which will become apparent in the discussion that follows, are achieved, according to the present invention, in that a spring-loaded check flap is additionally provided in each of the inlet channels of the piston. This check flap, which responds to the mass flow passing through the inlet passage, prevents exhaust gases from backing up through the inlet channels in the regions of the top dead centers of the associated lobes of the piston in the working chambers of the housing.

In order to ensure the proper functioning of the check flaps at both low and high engine speeds, according to a particular feature of the present invention, the check flaps are so arranged in the inlet channels of the rotating piston that the acceleration forces occurring in the course of rotation of the piston act upon each flap in a direction causing it to open when the corresponding lobe of the piston is approximately in an angular region between the point at which the inlet opening associated with the flap enters into a working chamber and the point that the lobe reaches top dead center and, similarly, so that the acceleration forces act in a direction causing the flap to close when the associated lobe is between the points of top and bottom dead center in that chamber. For this purpose, it is expedient that each check flap be so arranged in the associated inlet channel that, in the region of each top dead center of the associated lobe of the piston in the several working chambers, and preferably between 0° and 30° main drive shaft angle past top dead center, the center of mass and the pivot of the flap lie on a straight line that passes through the instantaneous pole of acceleration of the piston. Under these conditions it turns out that the check flaps open and close just at the required times, the spring action causing the flap to close being aided by the acceleration forces acting on the flap as the piston rotates. Especially at high engine speeds, where particularly high charge alternation losses occur in the absence of the check flaps according to the invention, the check flap actuation by force of acceleration shows up to great advantage.

In order to allow as little exhaust gas as possible to penetrate into the inlet channel, it is expedient to arrange each check flap close to the inlet opening of the inlet channel, at the periphery of the piston. A preferred embodiment of the invention is characterized in that each check flap comprises a leaf spring held at one end by a frame provided with window-like openings. When in the closed position, the leaf spring closes off the openings.

BRIEF DESCRIPTION OF THE DRAWINGS

FIGS. 3 to 6 are representational diagrams of a rotary piston internal combustion engine, incorporating check flaps in the inlet channels in accordance with the present invention, with its piston arranged in different successive positions in relation to its housing.

DESCRIPTION OF THE PREFERRED EMBODIMENTS

Figure 1:
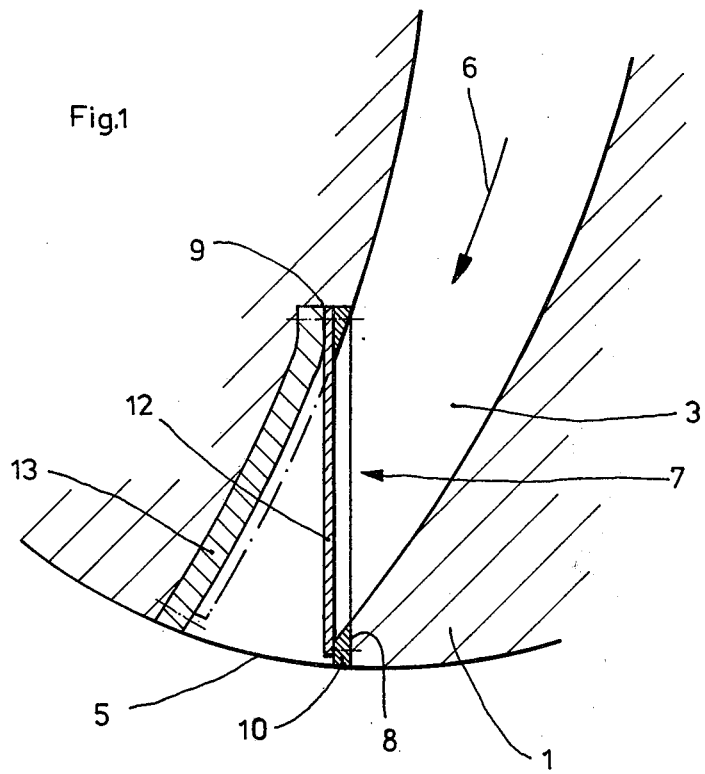
FIG. 1 is a cross-sectional view showing a portion of a piston with a check flap arranged in the inlet channel in accordance with the present invention.

The preferred embodiments of the present invention will now be described with reference to FIGS. 1–6 of the drawings. Identical elements in the various figures are designated by the same reference numerals.

In FIG. 1 the reference numeral 1 designates the piston of a circular piston engine of the trochoid type with meshing engagement and an exterior envelope curve. As may be seen in more detail in FIGS. 3 to 6, this is a type Ka 5:4 engine according to the classification of Felix Wankel in his book "Einteilung der Rotationskolbenmaschinen" (Classification of Engines with Rotary-Type Pistons) published in 1963 by the Deutsche Verlagsanstalt, Germany, in which the outer contour of the piston 1 is formed by a quadruarcuate epitrochoid and the inner contour of the surrounding housing 2 follows the exterior envelope curve of the piston 1, forming five arcuate working chambers. The type Ka 5:4 engine is also described and illustrated in commonly owned, copending U.S. Pat. application Ser. No. 468,234 now U.S. Pat. No. 3,883,276 which is a continuation application of Ser. No. 299,594, filed Oct. 20, 1972, abandoned, and in the U.S. Pat. No. 3,452,723 of J. Keylwert issned July 1, 1969 and assigned to Klockner-Humboldt-Deutz AG, Cologne-Deutz, Germany.

Figure 2:
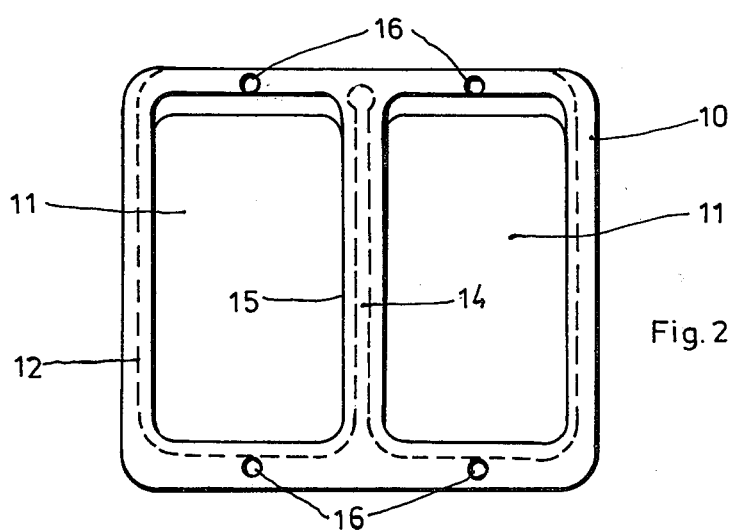
FIG. 2 is a top view of the check flap illustrated in FIG. 1.

In FIG. 1 the reference numeral 3 represents an inlet passage or channel leading to an inlet orifice or opening 5 on the periphery of the piston 1, through which the working medium such as an air-fuel mixture is supplied in the direction of the arrow 6. In the vicinity of the inlet orifice 5 there is arranged a check flap 7 that is normally closed by spring action. This check flap 7 has a frame 10 fixed in recesses 8 and 9 of the walls of the inlet passage, for example by means of countersunk screws, and exhibiting window-like apertures 11 as seen in FIG. 2. The reference numeral 12 represents a resilient plate of spring steel, rigidly attached at its upper end to the frame 10. This spring plate 12 rests against a seat 13 lying along the inlet passage 3, when gases flow through the inlet channel 3 in the direction of the arrow 6. As indicated in FIG. 2 by dashed lines, the spring plate 12 closes off the window-like apertures 11 in the frame 10, having a lengthwise slit 14 for better contact in the region of the frame crossbar 15.

The reference numeral 16 in FIG. 2 indicates screw holes for fastening the frame 10 to the piston 1.

As may be seen in FIGS. 1 and 2, the check flap 7 may be constructed to form an assembled unit consisting of the frame 10, the plate 12 and seat 13 for insertion into the matching recesses 8 and 9 of the inlet channel 3. This installation is preferably located as close as possible to the inlet orifice 5 of the channel 3 at the periphery of the piston 1.

The check flap 7 is actuated automatically according to the direction of mass flow through the inlet channel 3. During the intake cycle of the lobe of the piston associated with the inlet channel 3 - that is, from about top dead center to bottom dead center of this lobe in one of the arcuate working chambers of the housing - a fresh air-fuel mixture flows through the inlet channel in the direction of the arrow 6. During this intake cycle, the check flap 7 is open, the spring plate 12 occupying the position indicated by the dotted dashed lines in FIG. 1. After the lobe passes the bottom dead center point in this chamber, the check flap 7 closes, thus preventing the gases drawn in from backing out of the working chamber into the inlet channel 3. The check flap 7 also prevents exhaust gases from passing out of the working chamber into the inlet channel, as might happen especially when the inlet orifice 5 is entering the next, subsequent working chamber where the exhaust cycle expelling burned gases through the outlet passage arranged on the same lobe of the piston continues to take place until the piston lobe reaches top dead center.

The check flap 7, automatically controlled by the flow of mass through the inlet passage, thus prevents fresh gas or exhaust gas from backing up into the inlet channel during rotation of the piston, thereby very substantially improving the charge alternation of the engine.

Since the check flap according to the invention is mounted in the rotating piston, it is subject to the forces of acceleration which occur as a result of the piston's motion. With the piston rotating planetary-fashion in the instant internal combustion engine, this motion may be regarded at any moment as a rotation about a point, in which the acceleration is zero. This point, which will also be referred to as the "pole of acceleration", travels, as seen in the fixed system, upon a circle about the center of the housing (acceleration resting polar curve), and, as seen in the rotating system, upon a circle about the center of the piston (acceleration moving polar curve), respectively, in both cases in the direction opposite to the direction of rotation of the piston. The acceleration force acting on the check flap may in each instance be represented by a vector passing through the center of mass of the spring plate and directed radially outward from the pole of acceleration.

Now in order for this force of acceleration not to interfere with the actuation of the check flap as called for by the four-cycle process, the check flap must be so arranged that the force of acceleration will actuate the flap in the closing direction, as the piston rotates, approximately in the region between the entering of the inlet opening associated with the flap into a working chamber and the top dead center point of the corresponding lobe of the piston in that chamber, and so that the force of acceleration will actuate the flap in the opening direction when the corresponding lobe is between the top and bottom dead center points in that chamber. In this way, the force of acceleration resulting from the rotation of the piston and acting on the flap supports the actuation of the flap caused by spring action so that, at high speeds in particular, the flap opens and closes sufficiently rapidly at the proper times.

To illustrate this process of opening and closing the check flap in accordance with the present invention, reference is made to FIGS. 3 to 6. In these figures, the rotary piston engine is shown with the piston in various positions in relation to the housing. In each figure, as before, the reference numeral 1 designates the piston and 2 the housing surrounding the piston, while 3 represents the inlet passage or channel leading to the inlet orifice 5 at the periphery of the piston. The reference numeral 4 in each instance indicates an outlet orifice arranged on the same lobe of the piston.

As FIGS. 3 to 6 show, the piston 1 has four lobes, every other one of which has an inlet orifice 5 (or 5') and an outlet orifice 4 (or 4'). The surrounding housing 2 has an interior contour with five arcuate recesses forming, in cooperation with the several lobes of the piston, variable volumes of working chambers as the piston rotates.

The piston 1 is rotatably mounted about an eccentric 17, whose shaft 19 is mounted in end walls (not shown) of the housing 2. The reference numeral 18 indicates the pitch circle of an internal gear connected with the housing, meshing with a pinion of smaller diameter connected to the piston and controlling the motion of the piston relative to the housing. The reference numerals 20 to 24 designate the five arcuate recesses of the housing forming the working chambers, while 25 to 28 represent the four lobes of the piston 1. 29 indicates the sealing strips running lengthwise of the piston and in contact with the periphery of the piston, sealing off the several working chambers 20–24 from each other.

In FIGS. 3 to 6, the placement of the piston in relation to the housing has been varied by rotating the eccentric shaft 19 clockwise 90° at a time. This rotation of the eccentric shaft 19 involves a counterclockwise rotation of the piston 1.

Whereas in the piston position shown in FIG. 3 the lobe 25 of the piston is at top dead center in the working chamber 20 of the housing 2 (i.e., the point at which the volume of the working chamber enclosed between the piston lobe and the housing reached a minimum), as the piston 1 continues to rotate this lobe 25 moves toward the working chamber 21. At first, up to the piston position shown in FIG. 5 corresponding to about bottom dead center of working chamber 20, the intake cycle ensues, admitting the fresh gas into the working chamber 20 through the inlet orifice 5. During this period, the check flap 7 arranged in inlet channel 3 is open.

In FIG. 6, the lobe 25 has once more nearly reached the top dead center position, this time in the neighboring working chamber 21. Now, in order that no exhaust gas shall back up into the inlet channel 3 between the time when the inlet orifice 5 enters the new working chamber and the time when the associated piston lobe 25 reaches top dead center in that working chamber, the check flap 7 must be closed during a period beginning at about the position shown in FIG. 5 and nearly completed in the position shown in FIG. 6.

As has already been mentioned, the motion of the piston inside the housing may be regarded at any moment as a rotation about an instantaneous pole of acceleration. This pole of acceleration, as the piston rotates, travels in the direction opposite to the piston rotation on a circle about the center of the housing or the piston. The forces of acceleration acting at the several points of mass of the piston may then be represented by vectors whose direction is determined by the connecting line between the pole of acceleration and the mass point in question.

As relatively movable masses, the check flaps 7 arranged in the inlet channels 3 are affected by these acceleration forces. Now according to the invention, the check flaps 7 are to be so arranged in the inlet channels 3 of the piston that the acceleration forces acting at the centers of mass of the flaps will assist and support the automatic operation of opening and closing effected by the spring action and the mass flow.

In FIGS. 3 to 6, the reference numeral 30 designates the acceleration moving polar curve, indicated by a circle having its center at the central axis of the piston, and having a radius with the 16-fold of the eccentricity between the centers of the eccentric 17 and the shaft 19 on which the pole of acceleration, designated by B, travels as the piston rotates. $B_{OT}$ designates the pole of acceleration pertaining to the top dead center of the piston lobe 25, while $B_{UT}$ indicates the pole of acceleration pertaining to the bottom dead center of the lobe 25.

In the particular piston positions shown in FIGS. 3 to 6, the acceleration forces acting on the check flap 7 (or 7') are indicated by small arrows, the direction of which is given by connecting the center of mass of the flap 7 (7') with the instantaneous pole of acceleration. These forces of acceleration, acting at the centers of mass of the check flaps, produce torques about the respective check flap pivots causing the flaps to open or close. Only at those moments when the instantaneous pole of acceleration lies on the extension of the line connecting the center of mass and the pivot of a flap will there be no resultant torque on the flap. Such a case arises, for example, in the position shown in FIG. 3 where piston lobe 25 is at top dead center in housing recess 20. However, at the same moment, the check flap 7' in the inlet channel 3' of the opposed lobe 27 of the piston undergoes an acceleration force acting on the flap in opening direction.

Now as the piston 1 rotates further in the counterclockwise direction out of the position shown in FIG. 3, the instantaneous pole of acceleration B travels clockwise on the circle 30, so that the check flap 7 associated with lobe 25 experiences a force of acceleration in opening direction, as seen in FIG. 4. The check flap 7' associated with lobe 27, on the other hand, is then actuated in the closing direction.

The above-described relationships, and in particular the direction of the acceleration forces acting on check flaps 7 and 7', may be examined further by reference to the piston positions shown in FIGS. 5 and 6. It will be found that on each occasion the check flaps are actuated in the direction of closing approximately in the region of position between the entering of the inlet orifice associated with the flap into a working chamber and the top dead center point of the associated lobe of the piston in that working chamber. Thereafter, the flaps are actuated in the direction of opening when respective lobes are between the top and bottom dead centers in that working chamber.

In the preferred exemplary embodiment shown in the drawings a change in direction of action of the acceleration force on each flap occurs just at the top dead center position of its associated lobe of the piston. But since the bottom dead center point, characterized by maximum volume of a working chamber, does not occur exactly in between two successive top dead center points of the piston, it follows, as may be seen in FIG. 5 for check flap 7, that the flap will close shortly before its associated lobe reaches bottom dead center. In order to ensure that the intake cycle taking place in the several working chambers will actually not be completed until the respective lobe has moved to the bottom dead center position - i.e., in order that the check flap associated with the lobe will not be closed until that moment, even with the aid of the acceleration force - the flaps may alternatively be so arranged that the point of opening is not reached until shortly after, and preferably between 0° and 30° main drive shaft angle after, the position of top dead center.

It will be understood that the present invention is susceptible to various modifications, changes and adaptations which fall within its spirit and scope. Accordingly, it is intended that the present invention be limited only by the following claims and their equivalents.

I claim:

1. An internal combustion engine comprising an engine housing having a plurality of arcuate recess portions on the interior surface thereof and a piston arranged for planetary rotation within said housing and having, on its exterior surface, a plurality of convex lobe portions adapted for cooperation with recess portions of said housing to form working chambers therebetween, said piston further having an inlet and an exhaust channel extending therethrough to a respective inlet and exhaust opening in every other lobe portion thereof, each said inlet and exhaust opening being controlled by the positions of their associated lobe portion of said piston with respect to the recess portions of said housing, the improvement wherein said piston further comprises a spring loaded check flap arranged in each inlet channel, each said check flap being arranged in its associated channel with its center of mass located with respect to the pole of acceleration of the piston such that the acceleration forces, occurring as the piston revolves, act upon said flap in the direction of opening when its associated lobe portion is approximately in the region between the point at which the inlet opening in said associated lobe portion enters into a working chamber and the point of top dead center of said associated lobe portion in that working chamber, and the acceleration forces act upon said flap in the direction of closing when its associated lobe portion is approximately between the points of top and bottom dead center in that working chamber.

2. The internal combustion engine defined in claim 1, wherein said engine is a circular piston engine of the trochoid type.

3. The internal combustion engine defined in claim 1, wherein each said check flap is arranged close to an inlet opening of a corresponding inlet channel at the periphery of said piston.

4. The internal combustion engine defined in claim 1, wherein each said check flap includes at least one spring plate held at one end by a frame having window-like apertures, said spring plate being arranged to close off said apertures.

5. The internal combustion engine defined in claim 1, wherein each said check flap is arranged in its associated inlet channel such that the center of mass and the pivot thereof lie on a straight line through the instantaneous pole of acceleration of said piston when the lobe portion associated with said flap is in the region of top dead center at each of the several working chambers.

6. The internal combustion engine defined in claim 5, wherein each said check flap is arranged in its associated inlet channel such that the center of mass and the pivot thereof lie on a straight line through the instantaneous pole of acceleration of said piston when the lobe portion associated with said flap is between 0° and 30° main drive shaft angle past top dead center at each of the several working chambers.

* * * * *